(12) United States Patent
Tseng et al.

(10) Patent No.: US 10,805,903 B2
(45) Date of Patent: Oct. 13, 2020

(54) METHOD AND APPARATUS FOR PAGING TRANSMISSION

(71) Applicant: MEDIATEK INC., Hsinchu (TW)

(72) Inventors: Li-Chuan Tseng, Hsin-Chu (TW); Chia-Chun Hsu, Hsin-Chu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/240,287

(22) Filed: Jan. 4, 2019

(65) Prior Publication Data

US 2019/0223149 A1 Jul. 18, 2019

Related U.S. Application Data

(60) Provisional application No. 62/616,662, filed on Jan. 12, 2018.

(51) Int. Cl.
| | |
|---|---|
| *H04W 4/00* | (2018.01) |
| *H04W 68/02* | (2009.01) |
| *H04W 68/00* | (2009.01) |
| *H04W 16/28* | (2009.01) |
| *H04W 56/00* | (2009.01) |
| *H04W 72/04* | (2009.01) |

(52) U.S. Cl.
CPC ........... *H04W 68/02* (2013.01); *H04W 16/28* (2013.01); *H04W 56/001* (2013.01); *H04W 68/005* (2013.01); *H04W 72/042* (2013.01); *H04W 72/0446* (2013.01)

(58) Field of Classification Search
CPC ...... H04W 72/04; H04W 88/08; H04W 76/00
See application file for complete search history.

(56) References Cited

U.S. PATENT DOCUMENTS

| | | | | |
|---|---|---|---|---|
| 2009/0275368 | A1* | 11/2009 | Wang | H04W 28/08 455/574 |
| 2016/0014716 | A1* | 1/2016 | Tabet | H04W 72/042 455/458 |
| 2017/0019878 | A1* | 1/2017 | Hu | H04W 76/10 |
| 2017/0303235 | A1* | 10/2017 | Deogun | H04W 68/02 |
| 2017/0367069 | A1* | 12/2017 | Agiwal | H04W 68/02 |
| 2019/0349960 | A1* | 11/2019 | Li | H04W 2/1242 |

OTHER PUBLICATIONS

English translation of the International Search Report and Written Opinion of the International Searching Authority dated Apr. 16, 2019 in PCT/CN2019/071297 filed Jan. 11, 2019, 9 pages.

(Continued)

*Primary Examiner* — Siren Wei

(74) *Attorney, Agent, or Firm* — Oblon, McClelland, Maier & Neustadt, L.L.P.

(57) ABSTRACT

Aspects of the disclosure can provide an apparatus and method for paging transmission including receiving, by a processing circuitry of a user equipment, a synchronization signal burst in a beamformed wireless communication system for downlink synchronization, and receiving at least a paging frame offset. The method can further include selecting at least a paging frame of a frame structure that has system frame number that satisfies a paging frame formula, and remapping the selected paging frame to location within the frame structure based on the paging frame offset value.

15 Claims, 15 Drawing Sheets

(56) References Cited

OTHER PUBLICATIONS

"Paging Occasion in NR" MediaTek Inc., 3GPP TSG-RAN WG2 Meeting # 101bis, R2-1805106, Apr. 5, 2018, pp. 1-5.
"Paging Frame and Paging Occasion Calculation in NR" MediaTek: Inc., 3GPP TSG-RAN WG2 Meeting #102, R2-1807743 May 20, 2018, pp. 1-6.
"Comparison of different paging occasion calculation in NR" ZTE Corporation, Sane Chips, 3GPP TSG-RAN WG2 Meeting #99bis, R2-1710426, Oct. 13, 2017, 6 pages.
"Calculation of Paging Occasion" Intel Corporation, 3GPP TSG RAN NR Ad-Hoc, R2-1707058, Jun. 29, 2017, 2 pages.
Taiwanese Office Action dated Jan. 16, 2020, in Patent Application No. 108100974, 9 pages (with English Translation of Category of Cited Documents).
Nokia, B., "Paging in NR", 3GPP TSG-RAN WG1 meeting #91, R1-1720883, Nov. 27-Dec. 1, 2017, 8 pages.
Huawei, H., "Finalization of NR paging", 3GPP TSG RAN WG1 Meeting #91, R1-1719373, Nov. 27-Dec. 1, 2017, 7 pages.

\* cited by examiner

METHOD AND APPARATUS FOR PAGING TRANSMISSION

INCORPORATION BY REFERENCE

This present disclosure claims the benefit of U.S. Provisional Application No. 62/616,662, "Paging Transmission in NR with Sparser Synchronization Signals" filed on Jan. 12, 2018, which is incorporated herein by reference in its entirety.

TECHNICAL FIELD

The present disclosure relates to wireless communications, and specifically relates to paging transmission and reception in the fifth generation (5G) wireless communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

5G wireless communication systems operate at high frequencies (e.g., above 6 GHz) to increase system capacity and support massive device connectivity. In order to compensate for the unfavorable path loss of the high frequency signals, beamforming techniques are deployed to form directional transmitting signals. For example, in 5G new radio (NR) systems with multi-beam operation, a base station (BS) performs a beam sweeping to cover a serving area.

Paging is a mechanism in which a BS and a UE initiate the network connection. For example, the BS transmits synchronization signal blocks (SSBs) and paging messages periodically for downlink synchronization and paging transmission, respectively. The user equipment (UE) operates in idle or inactivity mode with no receiver processing most of the time to save energy consumption, and briefly wakes up according to a predefined cycle to monitor the paging channel. Unlike long term evolution (LTE) where the primary synchronization signal (PSS) appears every 5 ms, the periodicity of NR SSB may be much longer due to the beam sweeping. The synchronization may be less precise when a UE wakes up from long sleep and tries to detect a paging message transmitted far in time away from synchronization signal. Also, the paging messages may have larger bandwidth or be located at different frequency parts from the SSB in the same carrier.

SUMMARY

Aspects of the disclosure provide a method to select the paging frames (PFs) for paging transmission. The method includes receiving, by the processing circuitry of a user equipment (UE), a synchronization signal block (SSB) burst in a beamformed wireless communication system for downlink synchronization, receiving at least a PF offset value, selecting at least a PF of a frame structure that has system frame number (SFN) that satisfies a PF formula, and remapping the selected PF to location within the frame structure based on the PF offset value.

In an embodiment, remapping the selected PF based on the PF offset value further includes reducing the system frame number (SFN) of the selected PF by the PF offset value.

In an embodiment, remapping the selected PF to location within the frame structure based on the PF offset value, shifts the selected PF towards a corresponding SSB-carrying frame of the frame structure.

In an embodiment, the PF offset value is a non-negative integer included in system information that is received by the UE.

In an embodiment, the PF formula is a modulo formula that is based on a SFN, a UE identity (ID), a paging cycle, and a number of PFs in the paging cycle.

In an embodiment, SFN, the UE ID, the paging cycle, and the number of PFs in the paging cycle are included in system information that is received by the UE.

Aspects of the disclosure further provide a user equipment. The user equipment (UE) may include processing circuitry configured to receive a synchronization signal block (SSB) burst in a beamformed wireless communication system for downlink synchronization, receive at least a PF offset value, select at least a PF of a frame structure that has SFN that satisfies a PF formula, remap the selected PF to location within the frame structure based on the PF offset value.

Aspects of the disclosure further provide a base station. The base station (BS) may include processing circuitry configured to transmit a synchronization signal block (SSB) burst in a beamformed wireless communication system for downlink synchronization, transmit at least a PF offset value, select at least a PF a frame structure that has SFN that satisfies a PF formula, remap the selected PF to location within the frame structure based on the PF offset value.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure determine the locations of paging frames (PF) for paging transmission in a wireless communication system to improve the synchronization precision. Specifically, by considering the locations of synchronization signal blocks (SSBs), the frames that are positioned after the SSB-carrying frame can be selected to serve as the paging frames (PFs). In addition, the selected PFs can form a condensed paging frame burst, wherein the end of the paging frames is not far in time away from the SSBs. The user equipment (UE) can be properly and efficiently synchronized to receive the paging messages.

Figure 1:
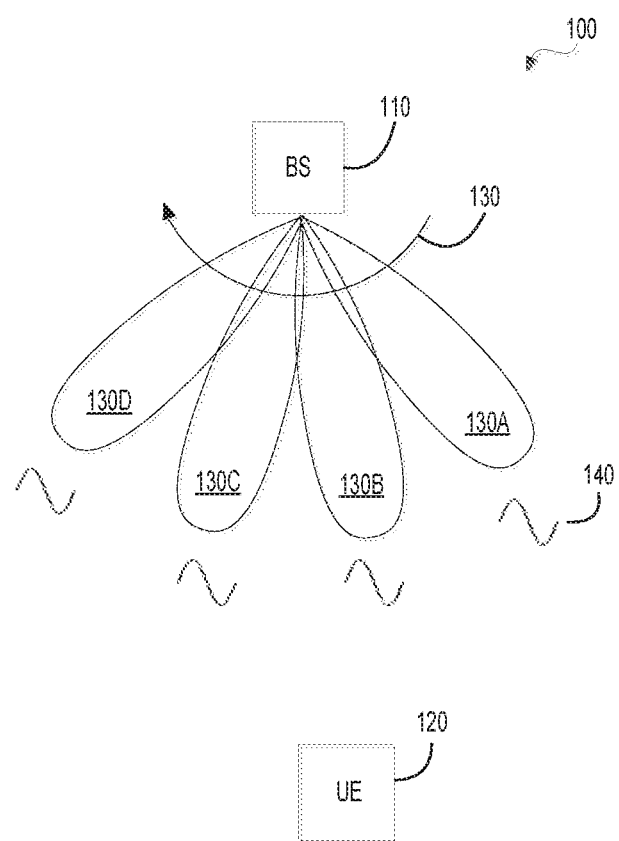
FIG. 1 shows a beam-based wireless communication system according to an exemplary embodiment of the disclosure.

FIG. 1 shows a wireless communication system 100 with multi-beam operation according to an exemplary embodiment of the disclosure. The system 100 can include a base station (BS) 110 and a UE 120 that communicate with each other wirelessly. For wireless communication, the system 100 can employ the fifth generation (5G) technologies developed by the 3$^{rd}$ Generation Partnership Group (3GPP). For example, millimeter wave (mmWave) frequency bands and beamforming technologies can be employed in the system 100. Accordingly, the BS 110 and the UE 120 can perform beamformed transmission or reception.

In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate for path loss or penetration loss due to the high frequency (e.g., above 6 GHz) signal transmission.

The BS 110 is a network element in the wireless communication system 100 responsible for wireless signal transmission and reception to or from the UE 120. In different wireless communication standards and technologies, the BS 110 can be referred to a base transceiver station (BTS), a radio base station, an access point, a radio transceiver, a base service set (BSS), an extended service set (ESS), a Node B (NB), a evolved Node B (eNB), a next generation eNodeB (gNB), or some other suitable terminology. In an embodiment, the BS 110 can be a next generation eNodeB (gNB) node as specified in 5G NR air interface standards developed by 3GPP. The BS 110 can be configured to control one or more antenna arrays to form directional Tx or Rx beams 130A-130D for transmitting or receiving wireless signals 140. In some examples, different sets of antenna arrays are distributed at different locations to cover different serving areas. These sets of antenna arrays can be formed to generate beams 130A-130D towards different vertical directions or horizontal directions.

The UE 120 is a network element in the wireless communication system 100 responsible for wireless signal transmission and reception to or from the BS 110. The UE 120 can be a mobile phone, a laptop computer, a tablet, a vehicle carried mobile communication device, a utility meter fixed at a certain location, a commercial product with wireless communication capability and the like. Similarly, the UE 120 can employ one or more antenna arrays to generate directional Tx or Rx beams for transmitting or receiving wireless signals 140. While only one UE 120 is depicted in FIG. 1, it should be understood that any number UEs 120 can be distributed in the wireless communication system 100.

The wireless signals 140 can be any data exchanged between the BS 110 and UE 120. For example, the wireless signal can be downlink control channel signals or data channel signals. In the present disclosure, the wireless signals 140 can be synchronization signal (SS), paging downlink control information (DCI) signal and paging data signal.

In FIG. 1 example, the BS 110 performs a beam sweeping 130 with a certain periodicity. It forms the beams 130A-130D towards different directions to transmit SS blocks (SSBs) and paging message 140. Herein, a sequence of SS blocks can be referred to as an SS burst. Each SSB is transmitted via a specific beam radiated in a certain direction.

After transmitting the SS burst, the BS 110 performs a beam sweeping 130 to forms the beams 130A-130D towards different directions to transmit the paging DCI and the paging data 140. Herein, each pair of paging DCI and paging data is transmitted via a specific beam radiated in a certain direction, and the paging data is positioned after the paging DCI.

In FIG. 1 example, UE 120 is configured to work in discontinuous reception (DRX) mode, wherein it remains in a sleeping mode most of the time in order to save power, and wakes up according to a pre-defined cycle to monitor if there is any paging message coming from the BS 110. When a UE 120 wakes up from the sleeping mode, the UE 120 need to synchronize with the BS 110. The UE 120 performs the synchronization based on the detecting and decoding the SS blocks.

Due to the beam-sweeping operation, the UE 120 receives a set of SS blocks (SSBs). In 5G NR, an SSB is known as the combination of synchronization signal (SS) and physical broadcast channel (PBCH). By detecting and decoding the SSB, the UE 120 can obtain information such as physical cell identity, achieve downlink synchronization in time/frequency domain and acquire time instants of PBCH channel. The SSB also carries basic system information (e.g., downlink system bandwidth, timing information in radio frame, SSB periodicity, system frame number (SFN), and other upper layer information) for the UE 120 to detect and receive the paging messages.

In operation, the BS 110 first transmits the SS blocks 140 via the beams 130A-130D. Each SS block 140 is transmitted via a specific beam radiated in a certain direction. Then, the BS 110 transmits the paging DCI and the paging data 140, respectively. Each pair of the paging DCI and the paging data 140 is transmitted via one of the directional beams 130-130D and the paging data is transmitted after the paging DCI. The UE 120 receives the SS blocks first. Then, the UE 120 performs the time and frequency synchronization by detection and decoding the SS blocks. Based on the information that included in the SS blocks, the UE 120 locates the paging occasion and wake up at the paging occasion to detect the paging DCI and the paging data. If the UE 120 finds its UE ID in the paging data, it will understand that the paging data is addressed to it and initiate a connection with the BS 110. Otherwise, the UE 120 will go back to sleeping mode and wake up in next paging cycle.

Figure 2:
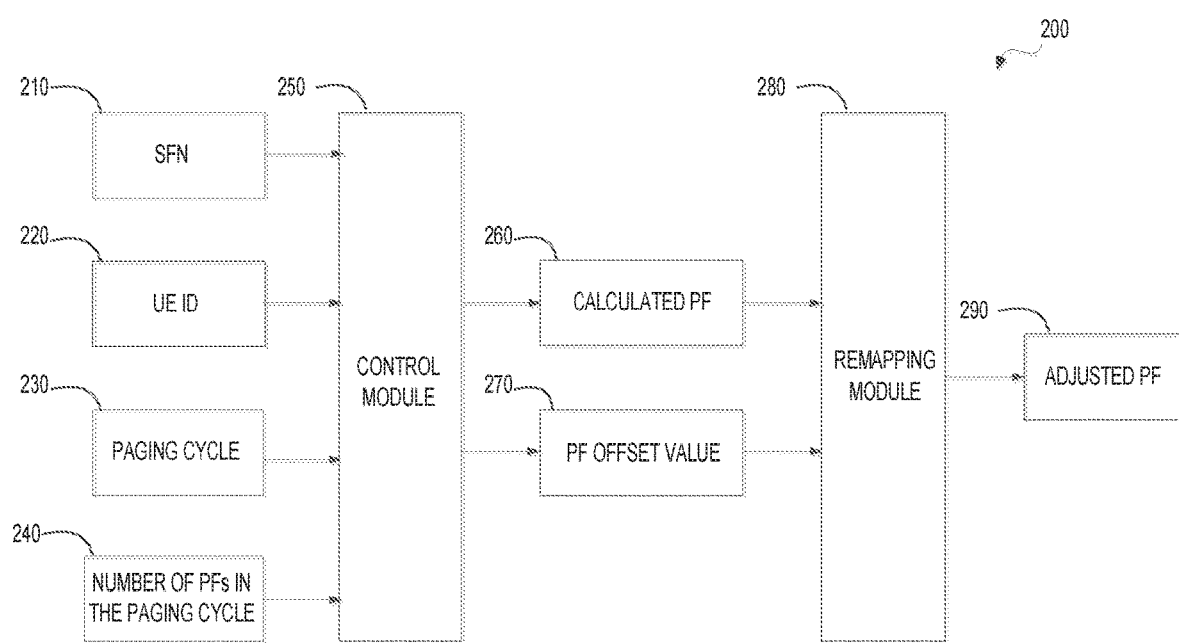
FIG. 2 shows an exemplary block diagram of a processing circuitry implementing PF calculation according to an embodiment of the disclosure.

FIG. 2 shows an exemplary block diagram of a processing circuitry 200 implementing PF calculation and adjustment according to an embodiment of the disclosure. Such processing circuitry 200 can be included in both the BS 110 and the UE 120 that are shown in FIG. 1. For example, the processing circuitry 200 can include a control module 250 that implement a modulo operation to identify the SFNs corresponding to PFs in the frame structure, and a remapping module 280 to remap the PFs to locations in the frame structure by adjusting their SFN based on a respective PF offset value. While the control module 250 and remapping module 280 are shown as separate modules, it should be understood that the modules can be a single or many modules, and that their respective functions can be distributed across various modules without departing from the spirit and scope of the disclosure.

The control module 250 implements a modulo operation that finds the remainder after division of one number by another to identify the SFN corresponding to PF in the frame structure. Specifically, the input parameters of the control module 250 are a SFN 210, a UE ID 220, a paging cycle 230, and a number of PFs in the paging cycle 240. The aforementioned input parameters can be obtained from the system information received by the UE 120. Then, the control module 250 can identify the SFN of the PF based on the modulo formula shown below:

$$PF:SFN \bmod T = \left(\frac{T}{N}\right) * (UE\_ID \bmod N), \quad (1)$$

where mod is the modulo operation sign, the paging cycle 230 is denoted as T, and the number of PFs in the paging cycle 240 is denoted as N. The PF is identified based on whether the respective SFN satisfies criteria, such as the formula (1) above.

The SFN of the PF that satisfies the formula (1) can be referred to as the calculated PF 260. Then the calculated PF 260, together with the PF offset value 270, are inputted to the remapping module 280 as the input parameters to remap the PF to location in the frame structure by adjusting the corresponding SFN based on a respective PF offset value. Specifically, the remapping module 280 remaps the calculated PF 260 by assigning it SFN that correspond to its original SFN minus a respective PF offset value 270. The remapping module 280 outputs an adjusted PF 290 within the frame structure.

In an embodiment, at least one PF offset value is transmitted from the BS 110 to the UE 120. In some examples, if the UE 120 only receives a single PF offset value, the UE 120 can apply the single PF offset value to all the calculated PFs 260. In other examples, if the UE 120 receives multiple PF offset values, the UE 120 can apply each of the PF offset values to the corresponding calculated PF 260, respectively.

In some examples, the SFN of the calculated PF 260 can be smaller than the respective PF offset value 270. The remapped SFN of the adjusted PF 290, which is calculated by subtracting a respective PF offset value from the original SFN of the calculated PF 260, can be less than zero, which is out of the range of the index of the SFN. As defined by the 5G NR standards, SFN can range from 0 to 1023, therefore, the UE 120 may need to wrap around the SFN of the adjusted PF 290 by adding 1024. Such wrap-around operation can be implemented in the remapping module 280.

In an alternative example, the control module 250 and the remapping module 280 can be combined to a single module, so that the control module 250 can implement a module operation together with a respective PF offset value to identify the SFN that corresponds to the location of the PF. Specifically, the input parameters of the control module 250 can include a SFN 210, a UE ID 220, a paging cycle 230, a number of PFs in the paging cycle 240, and a PF offset value 270. The aforementioned input parameters can be obtained from the system information received by the UE 120. Then, together with the respective PF offset value 270, the control module 250 can directly identify the SFN of the PF based on the module formula shown below:

$$PF:SFN + PF\_Offset \bmod T = \left(\frac{T}{N}\right) * (UE\_ID \bmod N), \quad (2)$$

where mod is the modulo operation sign, the paging cycle 230 is denoted as T, the number of PFs in the paging cycle 240 is denoted as N, and the PF offset value is denoted as PF_Offset. The PF is identified based on whether the respective SFN satisfies criteria, such as the formula (2) above.

It should be understood that by combining the control module 250 and the remapping module 280 to a single module, the intermediate process of obtaining calculated PF 260 and the remapping process of the original calculated PF 260 to the adjusted PF 290 can be removed. Instead, the SFN of the PF that satisfies the formula (2) can be directly referred to as the location of the adjusted PF 290.

After determining the location of the PF, the UE 120 can further look into the paging occasion (PO) located in the PF, based on the system information, such as UE ID, the number of PFs in the paging cycle, and the number of POs in the PF. A PO indicates the location where UE monitors DCI, and may contain multiple slots. Considering multi-beam operation in the 5G NR, it may take more than one slot to transmit a paging message with beam sweeping.

As defined by the 5G NR standards, the location of the PO can be determined by the index i_s, which can be determined by the following formula:

$$i\_s = \text{floor}\left(\frac{UE\_ID}{N}\right) \bmod Ns, \quad (3)$$

where floor is the floor function that takes as input a real number and gives as output the greatest integer less than or equal to the real number, the number of PFs in the paging cycle is denoted as N, and the number of POs in the PF is denoted as Ns.

In some examples, for default association, Ns is either 1 or 2. For Ns=1, there is only one PO which starts in the PF. For Ns=2, PO is either in the first half frame (i_s=0) or the second half frame (i_s=1) of the PF.

Figure 3:
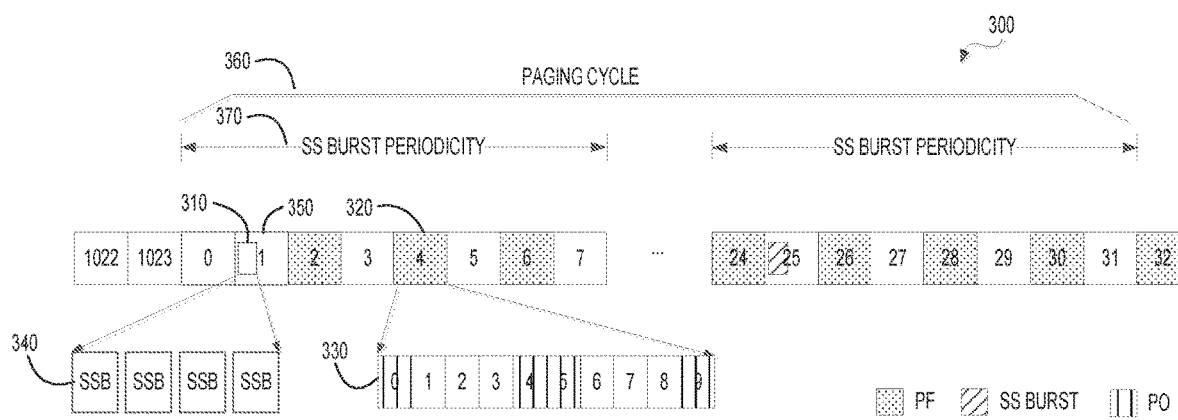
FIG. 3 shows a frame structure of synchronization and paging transmission according to an exemplary embodiment of the disclosure.

FIG. 3 shows an exemplary frame structure 300 having synchronization signal (SS) burst 310, PF 320 and PO 330 that can be used with the exemplary system 100. An SS burst 310 can include one or more SS blocks 340. Each SS block 340 can further include primary synchronization signal (PSS), secondary synchronization signal (SSS), and a physical broadcast channel (PBCH) that is carried on several consecutive symbols in an orthogonal frequency division multiplexing (OFDM) based system.

The BS 110 may periodically transmit a sequence of SS blocks (referred to as an SS burst). The SS burst 310 may be transmitted by performing a beam sweeping. For example, each SS block of the SS burst is transmitted using one of the beams 130A-130D.

Again, the frame structure 300 includes a PF 320 corresponding to the frame that is positioned after an SSB-carrying frame 350. Specifically, the PF 320 is assigned a SFN that corresponds to location of the PF within the frame structure 300. In an embodiment, the SFN of a PF can be assigned based on a UE ID, paging cycle 360, and number of paging frames in the paging cycle.

To align the paging frames with the SS blocks, the paging cycle 360 in 5G NR should be configured as multiples of an SS burst periodicity 370. Herein, the SS burst periodicity can be expressed as the number of frames, and each frame lasts for 10 milliseconds in time domain as defined by the 5G NR standards.

The PF 320 may contain one or more paging occasion(s) 330. A PO 330 is a radio subframe where the UE 120 will wake up from a sleeping mode and monitor the paging DCI. The PO 330 may contain one or more slots to transmit the paging data which is positioned behind the paging DCI. The location of the PO 330 can be determined by the UE ID, the number of PFs in the paging cycle, and the number of POs in the PF.

Particularly, the paging data contains the information of the UE ID so if the UE 120 does not find its UE ID inside the paging data, it will assume that it is not paged, and it will go back to idle or sleeping mode. However, if the UE 120 finds its UE ID in the paging data, it will understand that the paging data is addressed to it and initiate a connection with the BS 110.

In some examples, to improve the paging transmission efficiency for the multi-beam case with potential wide bandwidth, it is preferred to assign more UEs 120 to the same PO 330 so that the paging process can be less frequent while the paging capacity requirements are still met. As a consequence, the paging data may occupy a large bandwidth. Different frequency bandwidths can be assigned to carry different paging messages intended for different UEs 120.

Figure 4A:
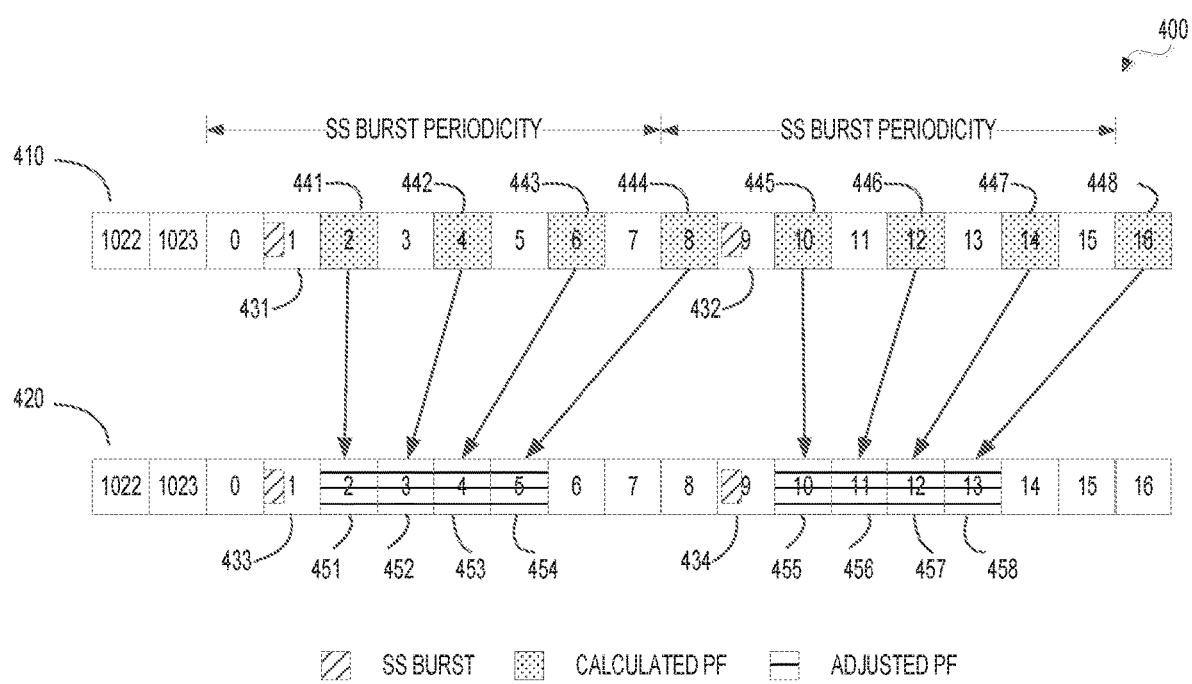
FIGS. 4A-4B shows a remapping scheme of the paging frames according to an exemplary embodiment of the disclosure.

FIG. 4A shows a scheme 400 for remapping PFs between locations in a calculated paging frame structure 410 and an adjusted paging frame structure 420, according to an exemplary embodiment of the disclosure. In this example, particular SFNs represent the locations of the SSB-carrying frames 431, 432, 433 and 434, the calculated PFs 441-444 and 445-448, and the adjusted PFs 451-454 and 455-458. Of course, it should be understood that different frame structure configurations can be used based on different system information, such as the SFN, the paging cycle, the number of PFs in the paging cycle, UE ID, and the PF offset values.

Remapping PFs between locations in a calculated paging frame structure 410 and an adjusted paging frame structure 420 can include a first step of identifying the SFN corresponding to PFs in the frame structure, and a second step of remapping the PFs to locations in the frame structure by adjusting their SFN based on a PF offset value.

In the first step, the PFs are identified based on whether their respective SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. The selected PF frames are referred to as the calculated PFs 441-444 and 445-448, as shown in the calculated paging frame structure 410.

In the second step, the calculated PFs that are partitioned between two adjacent SSB-carrying frames are remapped based on PF offset values that can be included in system information received by the UE 120. Exemplary PF offset values are shown in the table 460 of FIG. 4B. For example, the calculated PFs 441-444 that are located between SSB-carrying frames 431 and 432 are remapped to locations of the adjusted PFs 451-454 as shown in the adjusted paging frame structure 420. Specifically, the calculated PFs 441-444 are remapped by assigning them SFNs correspond to their respective original SFN minus a respective PF offset value.

Figure 4B:
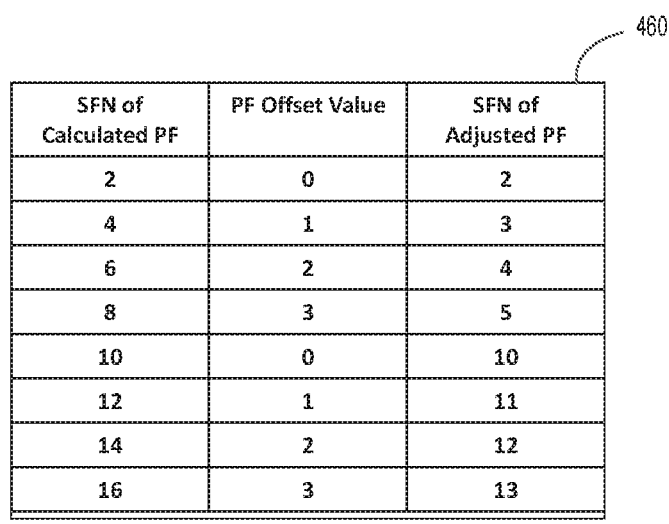

Referring to the table 460 in FIG. 4B, in this example the PF offset values corresponding to the original SFNs of the calculated PFs are assigned to each of the calculated PFs. For example, the PF offset values are set to 0, 1, 2, and 3 for the original SFNs 2, 4, 6, and 8, respectively, according to the remapping table 460. The adjusted PF's remapped SFN can be calculated by subtracting a respective PF offset value from the original SFN of the calculated PF. Accordingly, based on the PF offsets shown in table 460, the calculated PF 441 originally located at SFN 2 in the calculated paging frame structure 410 is remapped to SFN 2 (i.e., 2−0=2) in the adjusted paging frame structure 420. Similarly, the calculated PF 442 originally located at SFN 4 in the calculated paging frame structure 410 is remapped to SFN 3 (i.e., 4−1=3) in the adjusted paging frame structure 420. The calculated PF 443 originally located at SFN 6 in the calculated paging frame structure 410 is remapped to SFN 4 (i.e., 6−2=4) in the adjusted paging frame structure 420. The calculated PF 444 originally located at SFN 8 in the calculated paging frame structure 410 is remapped to SFN 5 (i.e., 8−3=5) in the adjusted paging frame structure 420. As a result, the locations of the adjusted PFs 451-454 are shifted to locations adjacent to the SSB-carrying frame 433. A similar process can be performed to remap the calculated PFs 445-448 to the adjusted PFs 455-458 based on the corresponding PF offset values included in the table 460, which are located adjacent to the SSB-carrying frame 434, as shown in the adjusted paging frame structure 420.

The PF offset values are non-negative integers. When the PF offset value is zero, the SFNs of the adjusted PFs can be the same as the SFNs of the calculated PFs. For example, the SFNs of the adjusted PFs 451 and 455 can be the same as the SFNs of the calculated PFs 441 and 445. When the PF offset value is not zero, the locations of the adjusted PFs are shifted towards a respective SSB-carrying frame by the number of the PF offset value. For example, the locations of the adjusted PFs 452-454 and 456-458 are shifted towards their respective SSB-carrying frame 433 and 434 by the number of the PF offset values.

As shown, relative to that of the calculated paging frame structure 410, the locations of the adjusted PFs in the adjusted paging frame structure 420 are closer to the SSB-carrying frames. As a result, the UE can operate more efficiently. Specifically, by remapping a group of originally spread out PFs so that they are consolidated together immediately after an SS burst, the UEs do not need to frequently switch status between a sleeping mode and a wake-up mode. This is because UEs need only to wake up and monitor the POs within the consolidated PFs, and then the UEs can stay in the sleeping time until to the next SS burst. Additionally, the resultant shortening of the time interval between the PFs and the SSB-carrying frames allows the UEs to maintain a more precise synchronization with the BS, by reducing a time misalignment between the UE and BS, since time misalignment between the UE and BS is more likely to occurs as the PFs are located further in time away from the SS burst.

For example, in the calculated paging frame structure 410, after detecting the SS burst and performing the synchronization with the BS 110, the UE 120 can wake up from a sleeping mode on the PO within the PF 441 for paging reception. If the UE 120 does not find its UE ID in the paging data, the UE 120 will go back to sleeping mode and wake up again on the next PO within the PF 442. The UE 120 will perform the similar process until: 1) it finds its UE ID in the paging data; or 2) the next SSB-carrying frame in which the UEs will perform synchronization again. It is noted that when the UE 120 wakes up in the PO in the PFs, such as 443 and 444, that are located far in time away from the SSB-carrying frame 431, the UE 120 may lose precise synchronization with the BS 110, due to Tx/Rx timing misalignment, so that the UE 120 may not be able to receive the paging message.

According the present disclosure and as shown in the adjusted paging frame structure 420, by remapping a group of originally spread out calculated PFs 441-444 and 445-448 so that they are consolidated together immediately after the SS bursts 433 and 434, the UEs 120 can wake up and detect the paging messages located on POs within the consolidated PFs 451-454 and 455-458 immediately after performing the synchronization in the SSB-carrying frames 433 and 434. As a result of shortening of the time interval between the PFs 451-454 and 455-458 and their respective SSB-carrying frames 433 and 434, the UE 120 to can maintain a more precise synchronization with the BS 110. This is because of a reduction in time misalignment between the UE 120 and BS 110, since the time misalignment between the UE 120 and BS 110 is more likely to occur as the PFs 451-454 and 455-458 are located further in time away from the SS bursts 433 and 434.

Figure 5A:
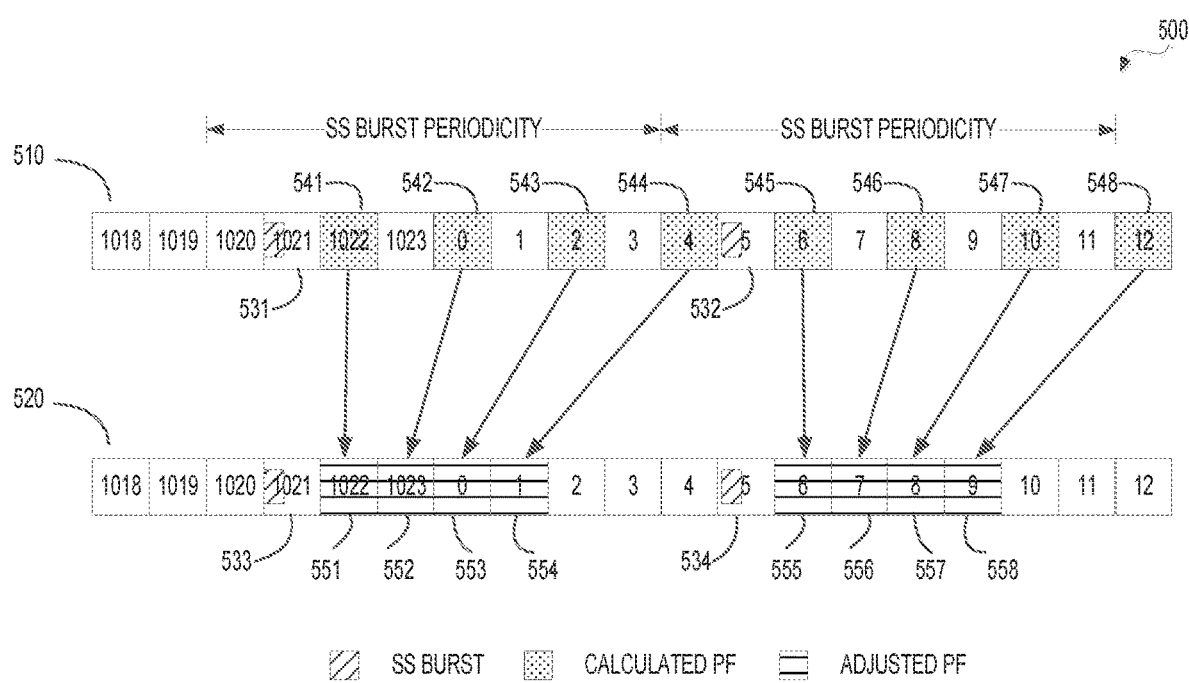
FIGS. 5A-5B shows a remapping scheme of the paging frames according to another exemplary embodiment of the disclosure.

FIG. 5A shows a scheme 500 for remapping PFs between locations in a calculated paging frame structure 510 and an adjusted paging frame structure 520, according to an exemplary embodiment of the disclosure. In this example, particular SFNs represent the locations of the SSB-carrying frames 531, 532, 533 and 534, the calculated PFs 541-544 and 545-548, and the adjusted PFs 551-554 and 555-558. Of course, it should be understood that different frame structure configurations can be used based on different system information, such as the SFN, UE ID, the paging cycle, the number of PFs in the paging cycle, and the PF offset values.

Remapping PFs between locations in a calculated paging frame structure 510 and an adjusted paging frame structure 520 can include a first step of identifying the SFN corresponding to PFs in the frame structure, and a second step of remapping the PFs to locations in the frame structure by adjusting their SFN based on a PF offset value.

In the first step, the PFs are identified based on whether their respective SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. The selected PF frames are referred to as the calculated PFs 541-544 and 545-548, as shown in the calculated paging frame structure 510.

In the second step, the calculated PFs that are partitioned between two adjacent SSB-carrying frames are remapped based on PF offset values that can be included in system information received by the UE 120. Exemplary PF offset values are shown in the table 560 of FIG. 5B. For example, the calculated PFs 541-544 that are located between SSB-carrying frames 531 and 532 are remapped to locations of the adjusted PFs 551-554 as shown in the adjusted paging frame structure 520. Specifically, the calculated PFs 541-544 are remapped by assigning them SFNs correspond to their respective original SFN minus a respective PF offset value.

As defined by the 5G NR standards, SFN can range from 0 to 1023. The SFN of the calculated PF can be smaller than the SFN of the SSB-carrying frame. In some examples, the calculated PF's SFN can also be smaller than the respective PF offset value. The adjusted PF's remapped SFN, which is calculated by subtracting a respective PF offset value from the original SFN of the calculated PF, can be less than zero. In order to ensure the adjusted PF's remapped SFN stay in the range (i.e., 0 to 1023), the UE may need to wrap around the SFN of the adjusted PF by adding 1024.

Figure 5B:
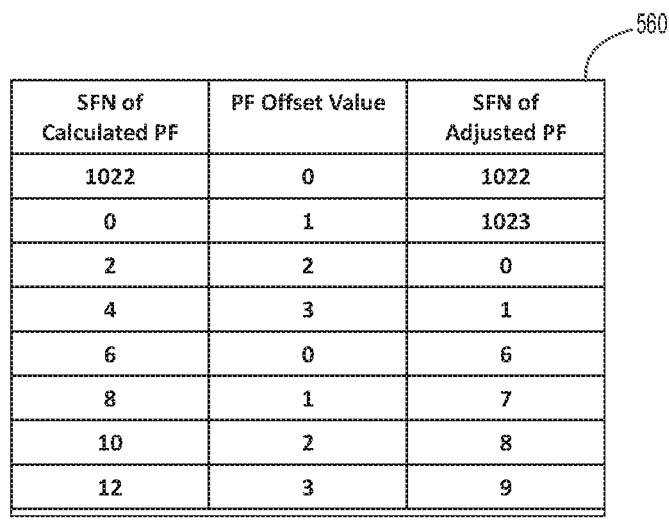

Referring to the table 560 in FIG. 5B, in this example the PF offset values corresponding to the original SFNs of the calculated PFs are assigned to each of the calculated PFs. For example, the PF offset values are set to 0, 1, 2, and 3 for the original SFNs 1022, 0, 2, and 4, respectively, according to the remapping table 560. The adjusted PF's remapped SFN can be calculated by subtracting a respective PF offset value from the original SFN of the calculated PF. Accordingly, based on the PF offsets shown in table 560, the calculated PF 541 originally located at SFN 1022 in the calculated paging frame structure 510 is remapped to SFN 1022 (i.e., 1022−0=1022) in the adjusted paging frame structure 520. The calculated PF 542 originally located at SFN 0 in the calculated paging frame structure 510 has a PF offset value 1. The adjusted PF's remapped SFN, which is calculated by subtracting a respective PF offset value (i.e., 1) from the original SFN (i.e., 0) of the calculated PF 542, is less than zero (i.e., 0−1=−1). In this special case, because SFN ranges from 0 to 1023 as defined by the 5G NR standards, the adjusted PF's remapped SFN need to be wrapped around by adding 1024. As a result, the calculated PF 542 is remapped to SFN 1023 (i.e., 0−1+1024=1023) in the adjusted paging frame structure 520. The calculated PF 543 originally located at SFN 2 in the calculated paging frame structure 510 is remapped to SFN 0 (i.e., 2−2=0) in the adjusted paging frame structure 520. Similarly, the calculated PF 544 originally located at SFN 4 in the calculated paging frame structure 510 is remapped to SFN 1 (i.e., 4−3=1) in the adjusted paging frame structure 520. As a result, the locations of the adjusted PFs 551-554 are shifted to locations adjacent to the SSB-carrying frame 533. A similar process can be performed to remap the calculated PFs 545-548 to the adjusted PFs 555-558 based on the corresponding PF offset values included in table 560, which are located adjacent to the SSB-carrying frame 534, as shown in the adjusted paging frame structure 520.

Figure 6:
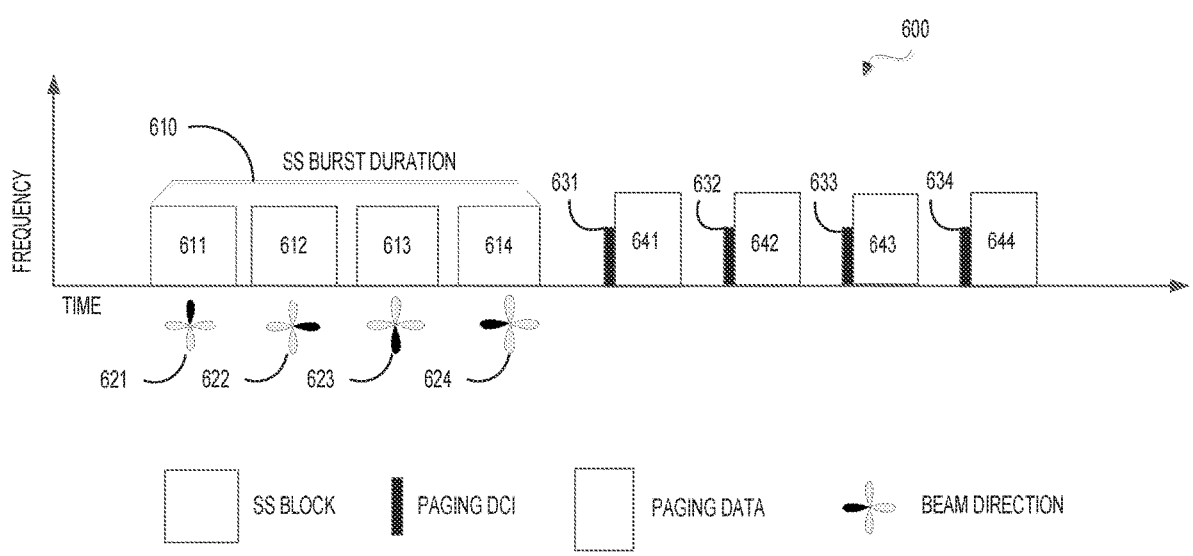
FIG. 6 illustrates a time and frequency allocation layout of frame structure according to an exemplary embodiment of the disclosure.

FIG. 6 illustrates a time and frequency allocation layout 600 of the adjusted paging frame structures shown in FIG. 4A and FIG. 5A, within a single SS burst periodicity according to an exemplary embodiment of the disclosure. An SS burst 610, which corresponds to one of the SS bursts in the SSB-carrying frames 431, 432, 433, and 434 as shown in FIG. 4A, and 531, 532, 533, and 534 as shown in FIG. 5A, can include one or more SS blocks 611-614. Each SS block 611-614 occupies a specific time interval and frequency bandwidth, and corresponds to a specific beam direction 621-624 of the BS 110. It should be understood that based on different system configurations, the SS blocks 611-614 can occupy the same or different frequency bandwidths.

Further, the paging DCI 631-634 and paging data 641-644 occupy the POs within the adjusted PFs 451-454 and 455-

458 as shown in FIG. 4A, and 551-554 and 555-558 as shown in FIG. 5A. Each pair of paging DCI 631-634 and paging data 641-644 is intended for a specific UE 120. It should be understood that the paging DCI 631-634 and paging data 641-644 can either occupy the POs located in different adjusted PFs 451-454 and 455-458 as shown in FIG. 4A, and 551-554 and 555-558 as shown in FIG. 5A, or occupy the POs located in the same adjusted PFs 451-454 and 455-458 as shown in FIG. 4A, and 551-554 and 555-558 as shown in FIG. 5A. The pairs of paging DCI 631-634 and paging data 641-644 can occupy the different time intervals. Additionally, the pairs of paging DCI 631-634 and paging data 641-644 can occupy the same or different frequency bandwidths.

In operation, the BS 110 first transmits the SS blocks 611-614 via the beams 621-624. Each SS block 611-614 is transmitted via a specific beam radiated in a certain direction. Some system information, such as physical cell identity, downlink system bandwidth, timing information in radio frame, SS burst periodicity, SFN, and other upper layer information can be carried by the SS blocks and be transmitted by the BS 110 to the UE 120. Some other system information, such as the paging cycle, PF offset value, number of PFs in the paging cycle, and the number of POs in the PF, can be transmitted by the BS 110 to the UE 120 via 5G NR master information block (MIB) and system information block (SIB). Herein, the MIB and SIB can be transmitted over some independent channels, such as a broadcast channel (BCH)/physical broadcast channel (PBCH) and downlink shared channel (DL-SCH), which can be defined by the 5G NR standards.

Then, the BS 110 can identify the PFs based on whether their respective SFNs satisfy criteria, such as the formula (1) above and apply the corresponding PF offset values for remapping the PFs. Within the remapped PFs, the BS 110 can locate the PO for paging transmission. Specifically, the BS 110 transmits the paging DCI 631-634 and paging data 631-634 pair by pair. The BS 110 first transmits a paging DCI 631-634 which includes some system information for detecting the following paging data 641-644. Then, the BS 110 can transmit a paging data 641-644 immediately after the paging DCI 631-634 to the UEs 120.

Before the synchronization, the UE 120 can receive some system information, such as the paging cycle, PF offset value, number of PFs in the paging cycle, and the number of POs in the PF, from the BS 110 via 5G NR master information block (MIB) and system information block (SIB). Herein, the MIB and SIB can be transmitted over some independent channels, such as BCH/PBCH and DL-SCH, which can be defined by the 5G NR standards. Then, the UE 120 can synchronize with the BS 110 in time and frequency domain by detecting and decoding the SS blocks that are transmitted by the BS 110.

Further, based on the system information, such as physical cell identity, downlink system bandwidth, timing information in radio frame, SS burst periodicity, SFN, and other upper layer information, that are carried by the SS blocks, the UE 120 can first identify the PFs based on whether their respective SFNs satisfy criteria, such as the formula (1) above. Then, the UE 120 can apply the corresponding PF offset values to remap the PFs to the locations of the adjusted PFs. Within the adjusted PFs, the UE 120 can further locate the PO for paging reception. Specifically, the UE 120 can first detect and decode the paging DCI 631-634, and then the paging data 641-644 immediately after the paging DCI 631-634. If the UE 120 does not find its UE ID included in the paging data 641-644, the UE 120 can go back to a sleep mode and wake up again on the PO in the next PF.

Figure 7A:
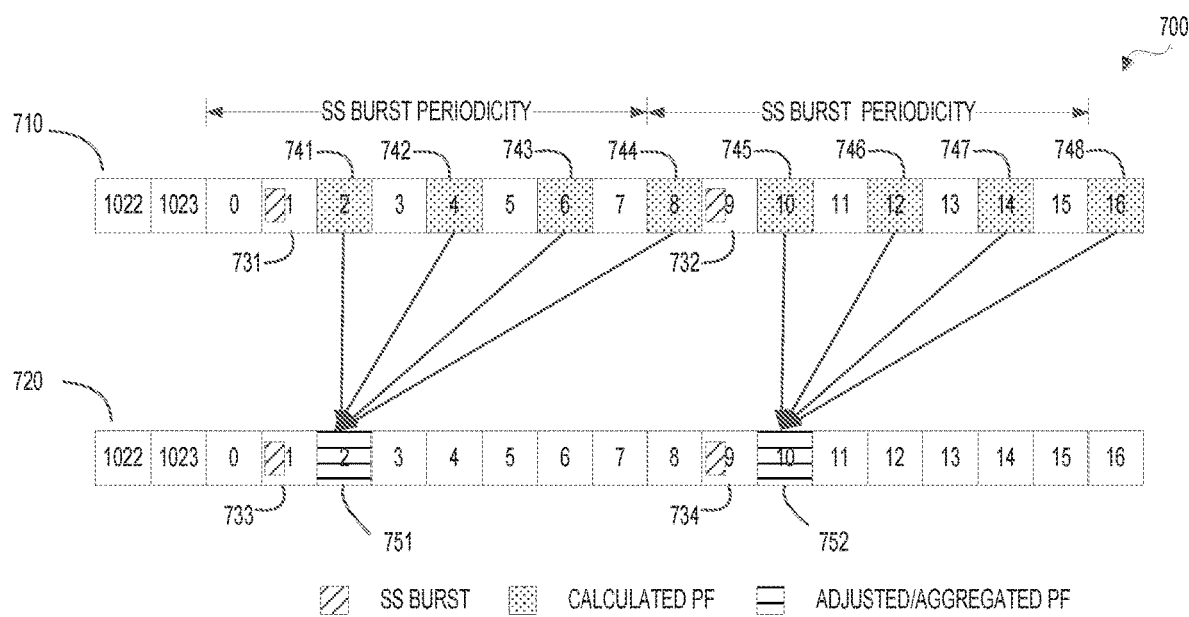
FIGS. 7A-7B shows another remapping scheme of paging frames according to an exemplary embodiment of the disclosure.

FIG. 7A shows a scheme 700 for remapping PFs between locations in a calculated paging frame structure 710 and an adjusted paging frame structure 720, according to an exemplary embodiment of the disclosure. In this example, particular SFNs represent the locations of the SSB-carrying frames 731, 732, 733 and 734, the calculated PFs 741-744 and 745-748, and the adjusted PFs 751 and 752. Of course, it should be understood that different frame structure configurations can be used based on different system information, such as the SFN, the paging cycle, the number of PFs in the paging cycle, UE ID, and the PF offset values.

Remapping PFs between locations in a calculated paging frame structure 710 and an adjusted paging frame structure 720 can include a first step of identifying the SFN corresponding to PFs in the frame structure, and a second step of remapping the PFs to a same location in the frame structure by adjusting their SFN based on PF offset values and possibly their respective frequencies.

In the first step, the PFs are identified based on whether their respective SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. The selected PF frames are referred to as the calculated PFs 741-744 and 745-748, as shown in the calculated paging frame structure 710.

In the second step, the calculated PFs that are partitioned between two adjacent SSB-carrying frames are remapped based on PF offset values to a same SFN or an aggregated PF in the adjusted system frame structure 720. Exemplary PF offset values are shown in the table 760 of FIG. 7B. For example, the calculated PFs 741-744 that are located between SSB-carrying frames 731 and 732 are remapped to an aggregated PF 751 as shown in the adjusted paging frame structure 720. Specifically, the calculated PFs 741-744 are remapped by assigning them SFNs correspond to their original SFN minus a respective PF offset value.

Further, in the second step, because the calculated PFs for different UEs are remapped to the same adjusted PF 751 or an aggregated PF 751, the paging data which is carried on the PO located within the aggregated PF 751 can occupy a wide bandwidth to satisfy the paging capacity for different UEs 120. Particularly, the paging data intended for different UEs 120 can be stacked up by any multiplexing techniques, such as frequency division multiplexing (FDM) techniques where paging data of the different UEs can be distributed across the frequency domain.

Figure 7B:
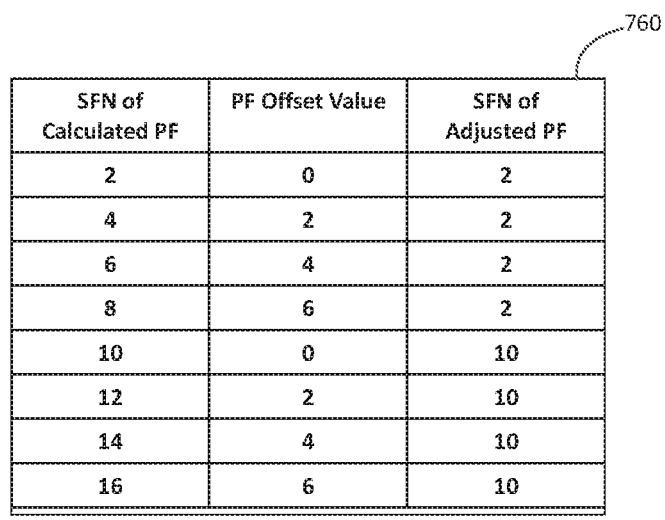

Referring to the table 760 in FIG. 7B, in this example the PF offset values corresponding to the original SFNs of the calculated PFs are assigned to each of the calculated PFs. For example, the PF offset values are set to 0, 2, 4, and 6 for the original SFNs 2, 4, 6, and 8, respectively, according to the remapping table 760. The adjusted PF's remapped SFN can be calculated by subtracting a respective PF offset value from the original SFN of the calculated PF. Accordingly, based on the PF offsets shown in table 760, the calculated PF 741 originally located at SFN 2 in the calculated paging frame structure 710 is remapped to SFN 2 (i.e., 2−0=2) in the adjusted paging frame structure 720. Similarly, the calculated PF 742 originally located at SFN 4 in the calculated paging frame structure 710 is remapped to SFN 2 (i.e., 4−2=2) in the adjusted paging frame structure 720. The calculated PF 743 originally located at SFN 6 in the calculated paging frame structure 710 is remapped to SFN 2 (i.e., 6−4=2) in the adjusted paging frame structure 720. The calculated PF 744 originally located at SFN 8 in the calculated paging frame structure 710 is remapped to SFN 2 (i.e., 8−6=2) in the adjusted paging frame structure 720. As a result, the locations of the calculated PFs 741-744 are remapped to the same adjusted PF 751, which is located adjacent to the SSB-carrying frame 733. A similar process can be performed to remap the calculated PFs 745-748 to the adjusted PF 752, which is located adjacent to the SSB-carrying frame 734, as shown in the adjusted paging frame structure 720.

The PF offset values are non-negative integers. When the PF offset value is zero, the SFNs of the adjusted PFs can be the same as the SFNs of the calculated PFs. For example, the SFNs of the adjusted PFs 751 and 752 can be the same as the SFNs of the calculated PFs 741 and 745. When the PF offset value is not zero, the locations of the calculated PFs are shifted towards a respective SSB-carrying frame by the number of the PF offset value. For example, the locations of the calculated PFs 742-744 and 746-748 are remapped to the adjusted PFs 751 and 752, respectively, that are shifted towards their respective SSB-carrying frame 733 and 734 by the number of the PF offset values.

As shown, relative to that of the calculated paging frame structure 710, the locations of the adjusted PFs in the adjusted paging frame structure 720 are closer to the SSB-carrying frames. As a result, the UE can operate more efficiently. Specifically, by remapping a group of originally spread out PFs to the same SFN or an aggregated PF immediately after an SS burst, the paging messages intended for multiple UEs can be multiplexed in frequency domain as an aggregated paging message and be carried on the same paging occasion in time domain within the single aggregated PF. As a result, the UEs do not need to frequently switch status between a sleeping mode and a wake-up mode. This is because the UEs only need wake up once on the PO within the single aggregated PF for paging reception, instead switching multiple times between a sleeping mode and a wake-up mode to monitor the paging DCI on the POs in other PFs. Additionally, the resultant shortening of the time interval between the PFs and the SSB-carrying frames allows the UEs to maintain a more precise synchronization with the BS, by reducing a time misalignment between the UE and BS, since the time misalignment between the UE and BS is more likely to occur as the PFs are located further in time away from the SS burst.

For example, in the calculated paging frame structure 710, after detecting the SS burst and performing the synchronization with the BS 110, the UE 120 can wake up from a sleeping mode on the PO within the PF 741 for paging reception. If the UE 120 does not find its UE ID in the paging data, the UE 120 will go back to sleeping mode and wake up again on the next PO within the PF 742. The UE 120 will perform the similar process until: 1) it finds its UE ID in the paging data, or 2) the next SSB-carrying frame in which the UEs will perform synchronization again. It is noted that when the UE 120 wakes up in the PO in the PFs, such as 743 and 744, that are located far in time away from the SSB-carrying frame, the UE 120 may lose precise synchronization with the BS 110, due to Tx/Rx timing misalignment, so that the UE 120 may not be able to receive the paging message.

According the present disclosure and as shown in the adjusted paging frame structure 720, by remapping a group of originally spread out calculated PFs 741-744 and 745-748 to the same SFN or the aggregated PFs 751 and 752 immediately after the SS bursts 733 and 734, the UEs 120 can wake up and detect the paging messages located on POs within the aggregated PFs 751 and 752, immediately after performing the synchronization in the SSB-carrying frames 733 and 734. The resultant shortening of the time interval between the PFs 751 and 752 and the SSB-carrying frames 733 and 734 allows the UE 120 to maintain a more precise synchronization with the BS 110, by reducing a time misalignment between the UE 120 and BS 110, since the time misalignment between the UE 120 and BS 110 is more likely to occur as the PFs 751 and 752 are located further in time away from the SS bursts 733 and 734.

Figure 8:
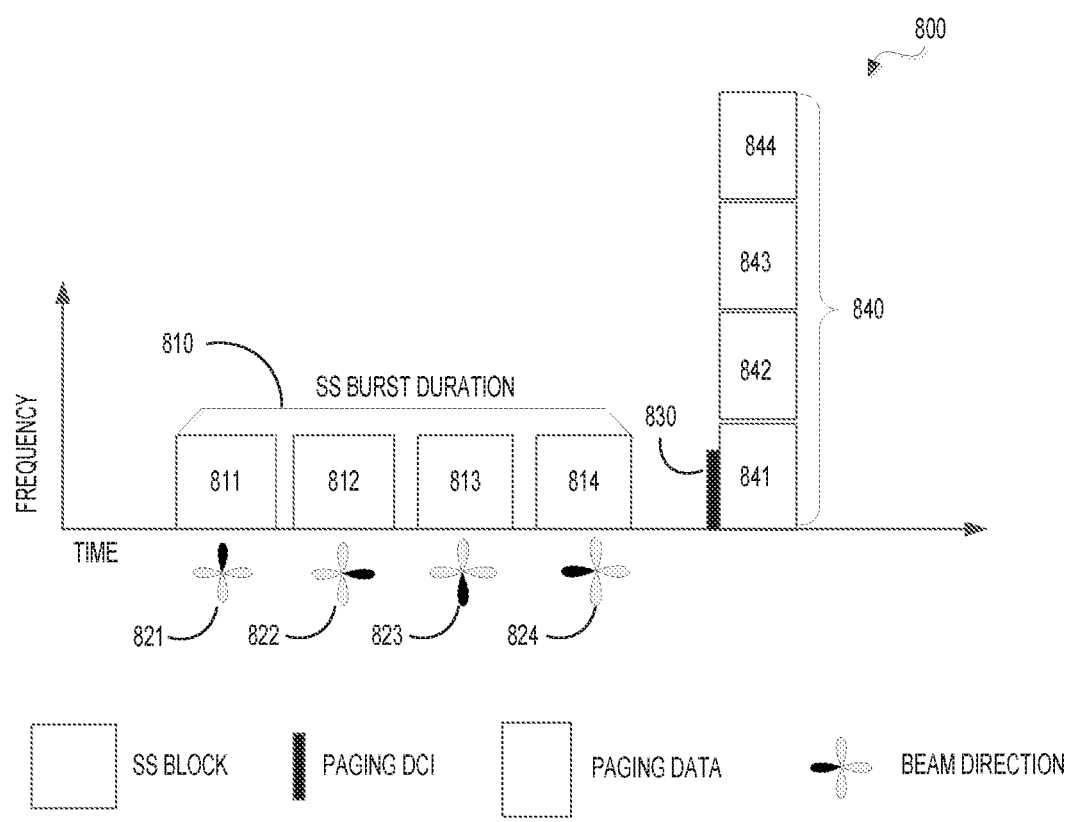
FIG. 8 illustrates a time and frequency allocation layout of the frame structure according to another exemplary embodiment of the disclosure.

FIG. 8 illustrates a time and frequency allocation layout 800 of the adjusted paging frame structure as shown in FIG. 7A, within a single SS burst periodicity according to an exemplary embodiment of the disclosure. An SS burst 810, which corresponds to one of the SS bursts in the SSB-carrying frames 731, 732, 733, and 734 as shown in FIG. 7A, can include one or more SS blocks 811-814. Each SS block 811-814 occupies a specific time interval and frequency bandwidth, and corresponds to a specific beam direction 821-824 of the BS 110. It should be understood that based on different system configurations, the SS blocks 811-814 can occupy the same or different frequency bandwidths.

Further, the paging DCI 830 and aggregated paging message 840 occupy the POs within the adjusted PFs 751 and 752 as shown in FIG. 7A. The pair of paging DCI 830 and aggregated paging message 840 occupies a single PO located in aggregated PFs 751 and 752 as shown in FIG. 7A. The aggregated paging message 840 can include the paging data 841-844 intended for the different UEs, whose original paging data are carried by the POs within the calculated PFs 741-744 and 745-748, as shown in FIG. 7A. In this example, the aggregated paging message 840 can stack up the paging data 841-844 by assigning each of the paging data 841-844 a specific frequency bandwidth, as shown in FIG. 8. The aggregated paging message 840 is positioned after a single paging DCI 830, so that different UEs 120 can use the same system information included in the paging DCI 830 to detect and decode the paging data 841-844 within the aggregated paging message 840.

In operation, the BS 110 first transmits the SS blocks 811-814 via the beams 821-824. Each SS block 811-814 is transmitted via a specific beam radiated in a certain direction. Some system information, such as physical cell identity, downlink system bandwidth, timing information in radio frame, SS burst periodicity, SFN, and other upper layer information can be carried by the SS blocks and be transmitted by the BS 110 to the UE 120. Some other system information, such as the paging cycle, PF offset value, number of PFs in the paging cycle, and the number of POs in the PF, can be transmitted by the BS 110 to the UE 120 via 5G NR master information block (MIB) and system information block (SIB). Then, the BS 110 can identify the PFs based on whether their respective SFNs satisfy criteria, such as the formula (1) above and applies the corresponding PF offset values for remapping the PFs.

Within the remapped PFs, the BS 110 can locate the PO for paging transmission. Specifically, the BS 110 first transmits the paging DCI 830 which includes some system information for detecting the following aggregated paging data 840. Then, the BS 110 can stack up the paging messages 841-844 intended for multiple UEs by assigning each paging message 841-844 intended for a respective UE 120 a specific frequency bandwidth. Of course, the BS 110 can also use any other multiplexing technique to combine the paging messages 841-844 intended for multiple UEs 120 together and occupy a frequency bandwidth. It should be understood that the paging data 840 can occupy a larger frequency bandwidth than the SS blocks 811-814, since it contains multiple UEs' paging messages 841-844. As a result, there may be some time interval between the last SS block 814 and the paging DCI 830 to allow the UE to perform synchronization and radio frequency (RF) switching. The RF switching time may be needed for the UEs to adjust its RF hardware modules, such as changing the frequency range of the receiving antennas. The BS 110 can transmit the paging data 840 immediately after the paging DCI 830 to the UEs 120.

Before the synchronization, the UE 120 can receive some system information, such as the paging cycle, PF offset value, number of PFs in the paging cycle, and the number of POs in the PF, from the BS 110 via 5G NR master information block (MIB) and system information block (SIB). Herein, the MIB and SIB can be transmitted over some independent channels, such as a broadcast channel (BCH)/ physical broadcast channel (PBCH) and downlink shared channel (DL-SCH), which can be defined by the 5G NR standards. Then, the UE 120 can synchronize with the BS 110 in time and frequency domain by detecting and decoding the SS blocks that are transmitted by the BS 110. Further, based on the system information, such as physical cell identity, downlink system bandwidth, timing information in radio frame, SS burst periodicity, SFN, and other upper layer information, that are carried by the SS blocks, the UE 120 can first identify the PFs based on whether their respective SFNs satisfy criteria, such as the formula (1) above. Then, the UE 120 can apply the corresponding PF offset values to remap the PFs to the locations of the aggregated PFs. Within the aggregated PFs, the UE 120 can further locate the PO for paging reception. Specifically, the UE 120 can first detect and decode the paging DCI 830, and then the paging data 840 immediately after the paging DCI 830.

Figure 9:
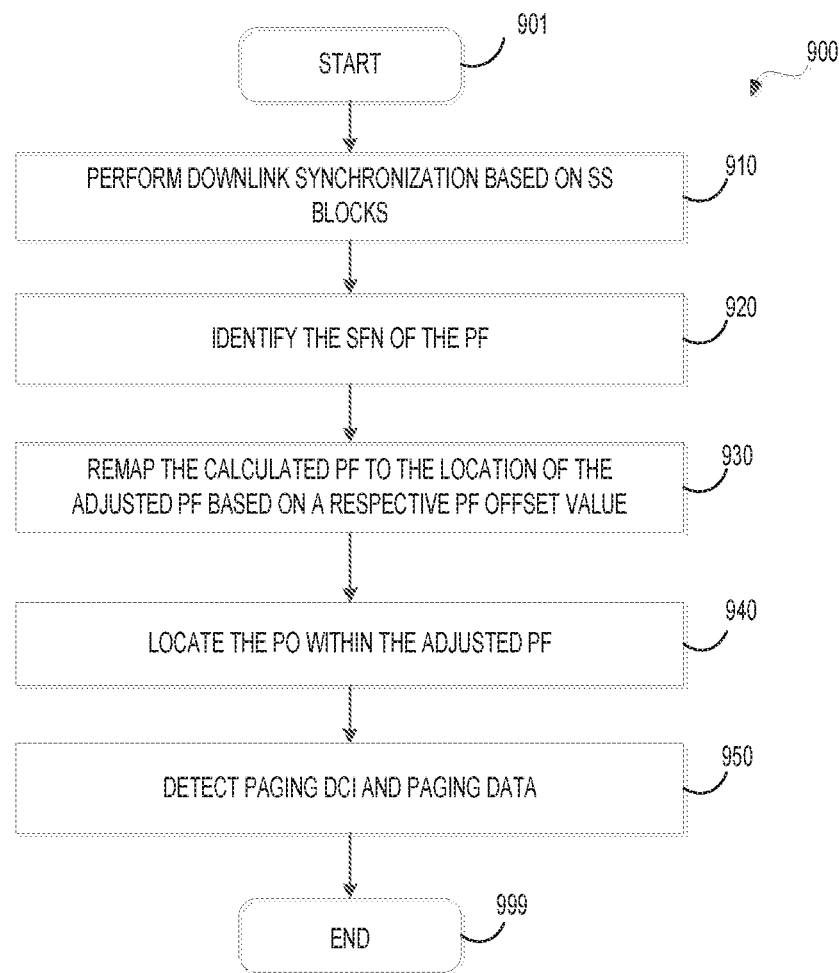
FIG. 9 shows a flowchart outlining an exemplary process of synchronization and paging transmission according to an embodiment of the disclosure.

FIG. 9 shows a flowchart outlining an exemplary process 900 of synchronization and paging transmission according to an embodiment of the disclosure. The process 900 can be performed at the UE 120 to detect an SS burst to synchronize with the BS 110, and further to detect a paging DCI and a paging data based on the adjusted PF calculation. The process 900 can start from 901 and proceed to 910.

At 910, a downlink synchronization is performed based on an SS block in order to synchronize the BS and the UE in time and frequency domain. For example, the UE 120 can periodically wake up from a sleeping mode according to a paging cycle. When the UE 120 wakes up, the UE 120 may monitor signals carrying the SS blocks that are transmitted by the BS 110. For example, the BS 110 may perform a beam sweeping to transmit a sequence of SS blocks. Each SS block is transmitted via a specific beam radiated in a certain direction. As the SS blocks are transmitted in a beamformed manner towards different directions from the BS 110, different SS blocks may have different signal strengths when reaching the UE 120. When an SS block having signal strength above a threshold is received, the UE 120 can decode the synchronization signals (e.g., PSS, SSS, and PBCH) included in the SS block, and subsequently synchronize with the BS 110 in time domain and frequency domain. The process can then proceed to 920.

At 920, the UE 120 can proceed to identify the SFNs of the PFs based on whether the SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. Specifically, some of the system information can be provided by the decoded SS blocks. Some of the system information can be provided by the MIB/SIB and can be transmitted to the UE 120 from the BS 110 via other independent channels, such as BCH/PBCH and DL-SCH, which can be defined by the 5G NR standards. The process can then proceed to 930.

At 930, the UE 120 can remap the PFs by adjusting their SFNs based on the PF offset values. In some examples, the UE 120 can only receive a single PF offset value. Then, the UE 120 can apply the single PF offset value to all the PFs. In other examples, the UE 120 can receive multiple PF offset values. Then, the UE 120 can apply each of the PF offset values to a respective PF. As shown in FIGS. 4A and 5A, the adjusted PFs can be remapped to be consolidated together immediately after the SS burst. In an alternative example, as shown in FIG. 7A, the adjusted PFs can be remapped to a same SFN or an aggregated PF. The process can then proceed to 940.

At 940, the UE 120 can locate the POs within the adjusted PFs or the aggregated PF, based on the formula (3) above. POs are subframes where the UE 120 can monitor the paging channel for detecting the paging DCI. As shown in FIG. 6 and FIG. 8, one PO can include one pair of paging DCI and paging data, or multiple pairs of paging DCI and paging data intended for one or more UEs 120. The process can then proceed to 950.

At 950, by locating the POs within the PFs, the UE 120 can detect the paging DCI that are positioned after the SS blocks. For example, after the synchronization, the UE 120 can proceed to decode the paging DCI. Further, based on the decoded system information included in the paging DCI, the UE 120 can detect and decode the paging data.

After obtaining and processing the paging data, the UE 120 can accordingly take an action in response to the information included in the received paging data. For example, if the UE 120 does not find its UE ID that are included in the decoded paging data, then the UE 120 can go back to a sleep mode until the next PO. Otherwise, if the UE 120 finds its UE ID that are included in the paging data, the UE 120 can establish a connection with the BS 110 for an incoming call, or a data reception request. The process can then proceed to 999 and terminate.

Figure 10:
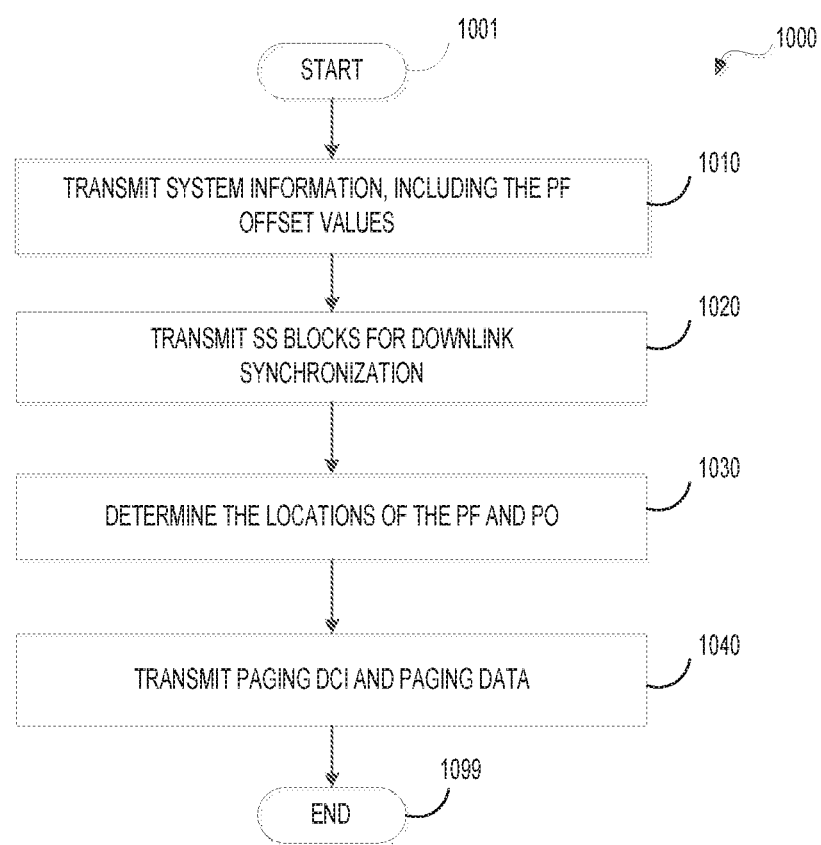
FIG. 10 shows a flowchart outlining an exemplary process of synchronization and paging transmission implementing on BS according to an embodiment of the disclosure.

FIG. 10 a flowchart outlining an exemplary process of synchronization and paging transmission 1000 by a BS 110 according to an embodiment of the disclosure. The process 1000 can start at 1001 and proceed to 1010.

At 1010, the BS 110 can transmit the system information to the UE 120. The system information can include a paging cycle, a PF offset values, a number of PFs in the paging cycle, and a number of POs in the PF, from the BS 110 via 5G NR MIB and SIB. Herein, the MIB and SIB can be transmitted over some independent channels, such as BCH/ PBCH and DL-SCH, which can be defined by the 5G NR standards. The process can then proceed to 1020.

At 1020, the BS 110 can perform a beam sweeping to transmit a sequence of SS blocks, as shown in FIG. 1. Each SS block is transmitted via a specific beam radiated in a certain direction. As the SS blocks are transmitted in a beamformed manner towards different directions from the BS 110, different SS blocks may have different signal strengths when reaching the UE 120. The SS blocks can include the synchronization signals (e.g., PSS, SSS, and PBCH) for downlink synchronization between the BS 110 and the UE 120 in time domain and frequency domain. The process can then proceed to 1030.

At 1030, the BS 110 can proceed to identify the SFNs of the PFs based on whether the SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. Then, the BS 110 can remap the PFs by adjusting their SFNs based on the PF offset values. In some examples, the BS 110 can only transmit a single PF offset value. Then, the BS 110 can apply the single PF offset value to all the PFs. In other examples, the BS 110 can transmit multiple PF offset values. Then, the BS 110 can apply each of the PF offset values to a respective PF. As shown in FIGS. 4A and 5A, the adjusted PFs can be remapped to be consolidated together immediately after the SS burst. In an alternative example, as shown in FIG. 7A, the adjusted PFs can be remapped to a same SFN or an aggregated PF. Further, BS 110 can locate the POs within the adjusted PFs or the aggregated PF, based on the formula (3) above. POs are subframes where the UE 120 can monitor the paging channel for detecting the paging DCI. As shown in FIG. 6 and FIG. 8, one PO can include one pair of paging DCI and paging data, or multiple pairs of paging DCI and paging data intended for one or more UEs 120. The BS 110 can transmit one pair of paging DCI and paging data separately on each of the POs, or the BS 110 can transmit one paging DCI, along with an aggregated paging data on a single PO. The process can then proceed to 1040.

At 1040, the BS 110 can transmit the paging DCI and the paging data, respectively, via a specific beam radiated in a certain direction, as shown in FIG. 1. Each pair of the paging DCI and the paging data 140 is transmitted via one of the directional beams, as shown in FIG. 1, and the paging data is transmitted after the paging DCI.

After transmitting the paging data, the BS 110 can take an action to wait for the response from the UE 120, or repeat the process 1000 to periodically transmit the synchronization signals and paging signals. If the BS 110 receives a response signal from the UE 120, the BS 110 can accordingly take an action in response to the information included in the received signal. For example, the BS 110 can establish a connection with the UE 120 for an incoming call, or a data reception request. The process 1000 can then proceed to 1099, and terminate at 1099.

Figure 11:
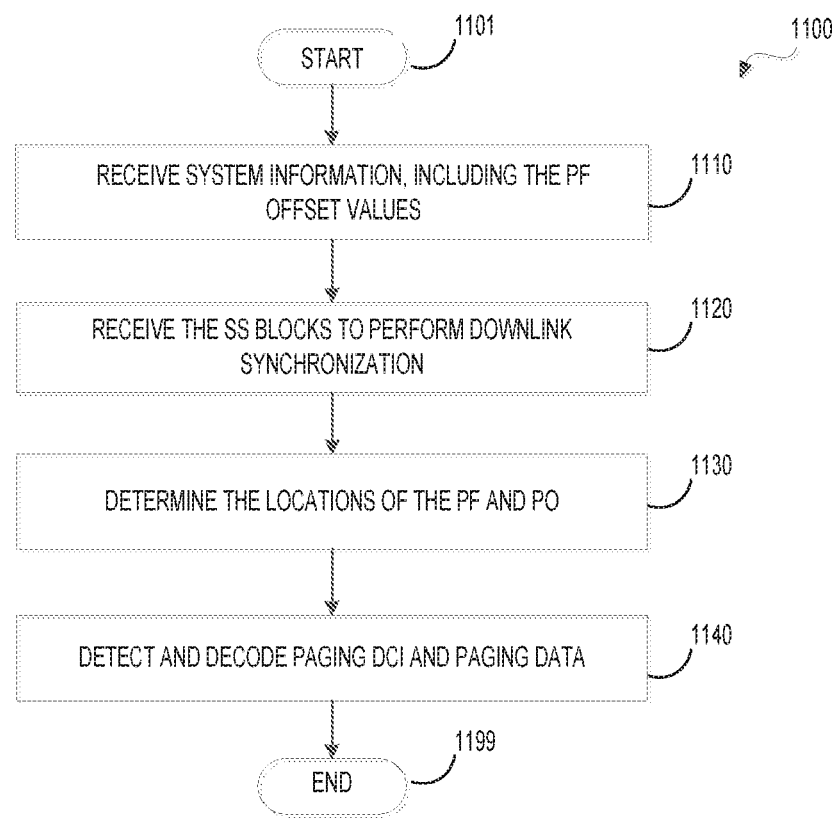
FIG. 11 shows a flowchart outlining an exemplary process of synchronization and paging transmission implementing on UE according to an embodiment of the disclosure.

FIG. 11 a flowchart outlining an exemplary process of synchronization and paging transmission 1100 by a UE 120 according to an embodiment of the disclosure. The process 1100 can start from 1101 and proceed to 1110.

At 1110, the UE 120 can receive the system information from the BS 110. The system information can include a paging cycle, a PF offset values, a number of PFs in the paging cycle, and a number of POs in the PF, from the BS 110 via 5G NR MIB and SIB. Herein, the MIB and SIB transmission can be transmitted over some independent channels, such as BCH/PBCH and DL-SCH, which can be defined by the 5G NR standards. The process can then proceed to 1120.

At 1120, a downlink synchronization is performed based on an SS block in order to synchronize the BS and the UE in time and frequency domain. For example, the UE 120 can periodically wake up from a sleeping mode according to a paging cycle. When the UE 120 wakes up, the UE 120 may listen to signals carrying the SS blocks that are transmitted by the BS 110. For example, the BS 110 may perform a beam sweeping to transmit a sequence of SS blocks. Each SS block is transmitted via a specific beam radiated in a certain direction. As the SS blocks are transmitted in a beamformed manner towards different directions from the BS 110, different SS blocks may have different signal strengths when reaching the UE 120. When an SS block having signal strength above a threshold is received, the UE 120 can decode the synchronization signals (e.g., PSS, SSS, and PBCH) included in the SS block, and subsequently synchronize with the BS 110 in time domain and frequency domain. The process can then proceed to 1130.

At 1130, the UE 120 can proceed to identify the SFNs of the PFs based on whether the SFNs satisfy criteria, such as the formula (1) above. Thus, depending on the system information, such as the UE ID, paging cycle, the number of PFs in the paging cycle, some frames of the frame structure having SFNs that satisfy the formula (1) are identified as the PFs, while other frames of the frame structure are not. Then, the UE 120 can remap the PFs by adjusting their SFNs based on the PF offset values. In some examples, the UE 120 can only receive a single PF offset value. Then, the UE 120 can apply the single PF offset value to all the PFs. In other examples, the UE 120 can receive multiple PF offset values. Then, the UE 120 can apply each of the PF offset values to a respective PF. As shown in FIGS. 4A and 5A, the adjusted PFs can be remapped to be consolidated together immediately after the SS burst. In an alternative example, as shown in FIG. 7A, the adjusted PFs can be remapped to a same SFN or an aggregated PF. Further, UE 120 can locate the POs within the adjusted PFs or the aggregated PF, based on the formula (3) above. POs are subframes where the UE 120 can monitor the paging channel for detecting the paging DCI. The process can then proceed to 1140.

At 1140, the UE 120 can detect the paging DCI that are positioned after the SS blocks. For example, after the synchronization, the UE 120 can proceed to decode the paging DCI. Further, based on the decoded system information included in the paging DCI, the UE 120 can detect and decode the paging data.

After obtaining and processing the paging data, the UE 120 can accordingly take an action in response to the information included in the received paging data. For example, if the UE 120 does not find its UE ID that are included in the decoded paging data, then the UE 120 can go back to a sleep mode until the next PO. Otherwise, if the UE 120 finds its UE ID that are included in the paging data, the UE 120 can establish a connection with the BS 110 for an incoming call, or a data reception request. The process 1100 can then proceed to 1199, and terminate.

Figure 12:
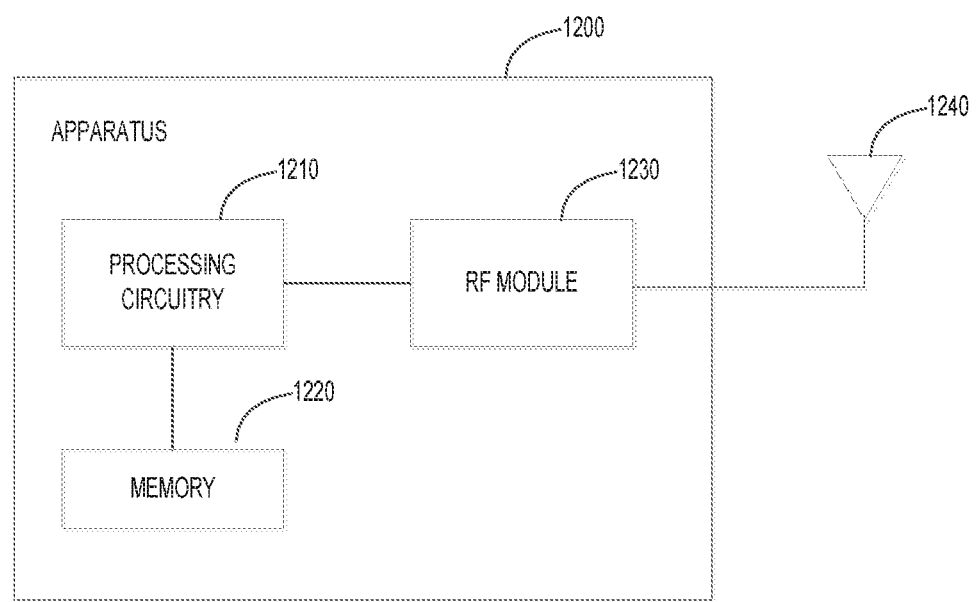
FIG. 12 shows an example apparatus according to an embodiment of the disclosure.

FIG. 12 shows an exemplary apparatus 1200 according to embodiments of the disclosure. The apparatus 1200 can be configured to perform various functions in accordance with one or more embodiments or examples described herein. Thus, the apparatus 1200 can provide means for implementation of techniques, processes, functions, components, systems described herein. For example, the apparatus 1200 can be used to implement functions of the BS 110 or the UE 120 in various embodiments and examples described herein. The apparatus 1200 can be a general purpose computer in some embodiments, and can be a device including specially designed circuits to implement various functions, components, or processes described herein in other embodiments. The apparatus 1200 can include processing circuitry 1210, a memory 1220, a radio frequency (RF) module 1230, and an antenna 1240.

In various examples, the processing circuitry 1210 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1210 can be a central processing unit (CPU) configured to execute program instructions to perform various functions and processes described herein. Accordingly, the memory 1220 can be configured to store program instructions. The processing circuitry 1210, when executing the program instructions, can perform the functions and processes. The memory 1220 can further store other programs or data, such as operating systems, application programs, and the like. The memory can include transitory or non-transitory storage medium. The memory 1220 can include a read only memory (ROM), a random access memory (RAM), a flash memory, a solid state memory, a hard disk drive, an optical disk drive, and the like.

The RF module 1230 receives processed data signal from the processing circuitry 1210 and transmits the signal in a beam-formed wireless communication network via an antenna 1240, or vice versa. The RF module 1230 can include a digital to analog convertor (DAC), an analog to digital converter (ADC), a frequency up convertor, a frequency down converter, filters, and amplifiers for reception and transmission operations. The RF module 1230 can include multi-antenna circuitry (e.g., analog signal phase/amplitude control units) for beamforming operations. The antenna 1240 can include one or more antenna arrays.

The apparatus 1200 can optionally include other components, such as input and output devices, additional or signal processing circuitry, and the like. Accordingly, the apparatus 1200 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for paging transmission, comprising:
   receiving, by processing circuitry of a user equipment (UE), a synchronization signal block (SSB) burst in a beamformed wireless communication system for downlink synchronization;
   receiving, by the processing circuitry of the UE, a paging frame (PF) offset value;
   selecting, by the processing circuitry of the UE, a PF of a frame structure, a first location of the selected PF within the frame structure corresponding to a first system frame number (SFN) that satisfies a PF formula; and
   remapping the selected PF to a second location within the frame structure based on the PF offset value, the second location being closer to a third location of a corresponding SSB-carrying frame within the frame structure than the first location.

2. The method for paging transmission according to claim 1, wherein
   the second location corresponds to a second SFN, and
   the remapping the selected PF to the second location within the frame structure based on the PF offset value comprises determining the second SFN by reducing the first SFN by the PF offset value.

3. The method for paging transmission according to claim 1, wherein the PF offset value is a non-negative integer included in system information that is received by the UE.

4. The method for paging transmission according to claim 1, wherein the PF formula is a modulo formula that is based a UE identity (ID), a paging cycle, and a number of PFs in the paging cycle.

5. The method for paging transmission according to claim 4, wherein the UE ID, the paging cycle, and the number of PFs in the paging cycle are included in system information that is received by the UE.

6. A user equipment, comprising processing circuitry configured to:
   receive a synchronization signal block (SSB) burst in a beamformed wireless communication system for downlink synchronization;
   receive a paging frame (PF) offset value;
   select a PF of a frame structure, a first location of the selected PF within the frame structure corresponding to a first system frame number (SFN) that satisfies a PF formula;
   remap the selected PF to a second location within the frame structure based on the PF offset value, the second location being closer to a third location of a corresponding SSB-carrying frame within the frame structure than the first location.

7. The user equipment of claim 6, wherein
   the second location corresponds to a second SFN, and
   the processing circuitry is configured to determine the second SFN by reducing the first SFN by the PF offset value.

8. The user equipment of claim 6, wherein the PF offset value is a non-negative integer included in system information that is received by the user equipment.

9. The user equipment of claim 6, wherein the PF formula is a modulo formula that is based on a user equipment (UE) identity (ID), a paging cycle, and a number of PFs in the paging cycle.

10. The user equipment of claim 9, wherein the processing circuitry is further configured to receive the UE ID, the paging cycle, and the number of PFs in the paging cycle that are included in system information.

11. A base station, comprising processing circuitry configured to:
  transmit a synchronization signal block (SSB) burst in a beamformed wireless communication system for downlink synchronization;
  transmit a paging frame (PF) offset value;
  select a PF of a frame structure, a first location of the selected PF within the frame structure corresponding to a first system frame number (SFN) that satisfies a PF formula;
  remap the selected PF to a second location within the frame structure based on the PF offset value, the second location being closer to a third location of a corresponding SSB-carrying frame within the frame structure than the first location; and
  transmit the selected PF according to the second location within the frame structure.

12. The base station of claim 11, wherein
  the second location corresponds to a second SFN, and
  the processing circuitry is configured to determining the second SFN by reducing the first SFN by the PF offset value.

13. The base station of claim 11, wherein the PF offset value is a non-negative integer included in system information that is transmitted by the base station.

14. The base station of claim 11, wherein the PF formula is a modulo formula that is based on a user equipment (UE) identity (ID), a paging cycle, and a number of PFs in the paging cycle.

15. The base station of claim 14, wherein the processing circuitry is further configured to transmit the UE ID, the paging cycle, and the number of PFs in the paging cycle that are included in system information.

* * * * *